March 12, 1929.  R. G. ZELEDON  1,704,907

PISTON RING

Filed Feb. 23, 1928

INVENTOR
RALPH G. ZELEDON
BY Hazard and Miller
ATTORNEYS

Patented Mar. 12, 1929.

1,704,907

UNITED STATES PATENT OFFICE.

RALPH G. ZELEDON, OF SOUTH PASADENA, CALIFORNIA.

PISTON RING.

Application filed February 23, 1928. Serial No. 256,337.

This invention relates to reciprocating engines, and more especially to an improved type of piston ring adaptable for use with such engines.

An object of the invention is the provision of a piston ring possessed of an increased degree of flexibility resulting in its being capable of conforming itself to the walls of the cylinder within which it is reciprocated by its associated piston, to establish an efficient, sliding seal therewith, even in the event that irregularities are present in the cylinder wall. These irregularities may be in the form of variations of the cross section of the cylinder from a true circle, and/or variations in the diameter of the cylinder throughout its length, without having a deleterious effect upon the efficient operation of my improved ring.

A further object is the provision of a ring of the character described, capable of having resilient means associated therewith and urging the ring to expand, and thus insuring a more efficient seal with the cylinder wall. Thus it may be seen that I have provided a piston ring which, while capable of adding to the efficiency of relatively new reciprocating engines, and more especially those of the internal combustion type, my ring is particularly adapted for installation in internal combustion engines which have been in service for such a length of time that the cylinder walls have become somewhat worn. The installation of my improved rings in an engine which has become so worn, will not only add to the efficiency of the engine by increasing the compression and preventing the escape of combustion gases under pressure past the piston and preventing the influx of lubricating oil from the crank case into the combustion chamber, but will also serve to eliminate a certain degree of "piston-slap" and thus cause the engine to operate more nearly silently in addition to more efficiently.

With the foregoing and other objects in view which will be made manifest in the following detailed description and specifically pointed out in the appended claims, reference is had to the accompanying drawings for an illustrative embodiment of the invention, wherein:

The preferred embodiment of my improved piston ring is herein shown and described as having a cylindrical outer surface 6, having flanges 7 and 8 extending inwards from the top and bottom edges of the outer surface 6, to provide a groove 9 therebetween. In other words, the ring is channel-shaped in cross section, with the flanges 7 and 8 of the channel extending toward the center of the ring. The inner edge of each of the flanges 7 and 8 is serrated by being provided with a plurality of notches 11; the purpose of these notches being to add to the flexibility of the ring by decreasing the cross sectional area of the ring at various points throughout its circumference.

Figure 1:
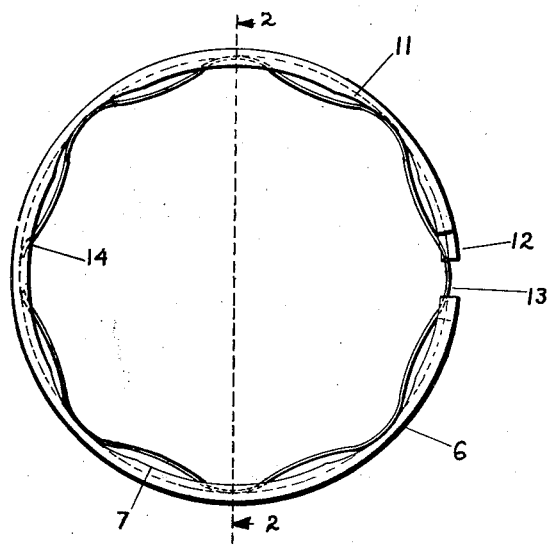
Figure 1 is a top plan view of my improved piston ring.
Figure 2:
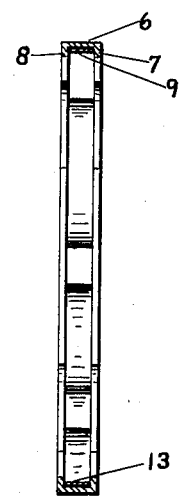
Fig. 2 is a transverse, medial, sectional view, the plane of section being indicated by the line 2—2 of Fig. 1.

At one point in the circumference of the ring, a lap joint 12 is provided. However, I do not wish to be limited to this particular form of joint, as any of the well known types of piston ring joints may be employed according to the requirements of the immediate case. A preferably sinuous strip 13 is disposed within the groove 9. This strip may conveniently be formed from suitable spring steel or other metal possessed of the required degree of resiliency. The strip is formed of a width permitting its reception between the flanges 7 and 8, and is provided with a plurality of convolutions 14 to give the strip a certain degree of sinuosity. After the strip 13 has been so formed, it is inserted into the groove 9 of the ring between the flanges 7 and 8, as clearly shown in Fig. 2. It is to be understood of course, that the ring is formed of such width that it is properly received within the piston ring groove of the piston 16; and of such diameter that it fits properly within the cylinder 17 of the reciprocating engine in which the ring is to be installed.

Figure 3:
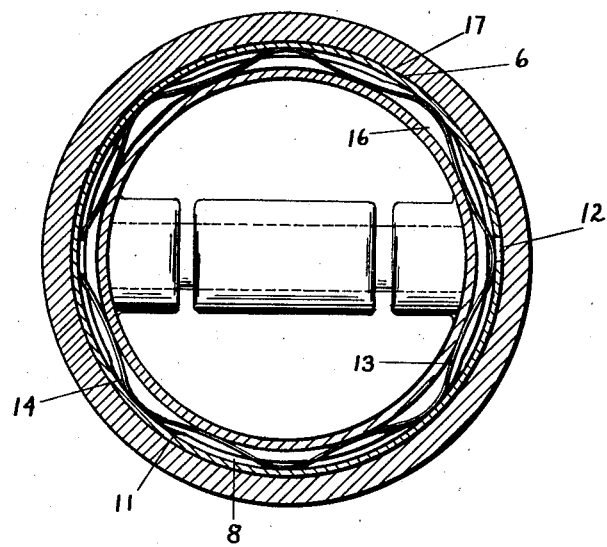
Fig. 3 is a horizontal, sectional view taken through the center of one of my improved piston rings, and transversely of the piston and the cylinder within which the ring is mounted.

In operation, my improved piston ring, as clearly shown in Fig. 3, is thrust outwards by the resilient strip 13 against the wall of the cylinder 17. The serrations 11 within the flanges 7 and 8 add to the flexibility of the ring, so that expansion thereof by the strip 13 is facilitated. Thus it may be seen that the ring is capable of expanding and contracting as it reciprocates within the cylinder 17 to conform itself to any irregularities within certain limits, that might be present in the cylinder wall 17. The advantages gained by such a construction are thought to be obvious, in that increased compression, elimination of waste of combustion gases and lubricating oil, and elimination of "piston-slap" is effected by the installation of such rings.

It is to be observed that the inclusion of the flanges 7 and 8 further serves to effectually increase the difference between the inside and outside diameters of the ring. An advantage gained as a result of this feature, is the fact that greater surfaces of contact between the ring and the sides of the piston ring groove in the piston will be presented, so as to decrease the wear therebetween. Also, the danger of the ring slipping from the groove is minimized.

Various changes in the details of construction may be made without departing from the spirit and scope of the invention as defined by the appended claims.

I claim:

1. In the art described, a piston ring comprising a cylindrical outer surface, and flanges extending inwards from the top and bottom edges of said outer surface, said flanges being provided with a plurality of rounded notches to increase the flexibility of said ring.

2. In the art described, a piston ring comprising a cylindrical outer surface, and flanges extending inwards from the top and bottom edges of said outer surface to provide a groove therebetween, said flanges being provided with a plurality of rounded notches to increase the flexibility of said ring, and a resilient strip disposed in said groove, urging said ring to expand.

3. In the art described, a piston ring comprising a cylindrical outer surface, and flanges extending inwards from the top and bottom edges of said outer surface to provide a groove therebetween, said flanges being provided with a plurality of rounded notches to increase the flexibility of said ring, and a sinuous resilient strip disposed in said groove, urging said ring to expand.

In testimony whereof I have signed my name to this specification.

RALPH G. ZELEDON.